US008958158B1

(12) United States Patent
Raffle et al.

(10) Patent No.: US 8,958,158 B1
(45) Date of Patent: Feb. 17, 2015

(54) ON-HEAD DETECTION FOR HEAD-MOUNTED DISPLAY

(71) Applicant: Google Inc., Mountain View, CA (US)

(72) Inventors: Hayes Solos Raffle, Palo Alto, CA (US); Matthew Wyatt Martin, Ross, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/095,649

(22) Filed: Dec. 3, 2013

(51) Int. Cl.
*G02B 27/14* (2006.01)
*G02B 27/00* (2006.01)
*G01B 11/14* (2006.01)
*G02B 27/01* (2006.01)

(52) U.S. Cl.
CPC ............ *G02B 27/0093* (2013.01); *G01B 11/14* (2013.01); *G02B 27/0176* (2013.01)
USPC ........................................................ 359/630

(58) Field of Classification Search
USPC .................................................. 359/13, 630
See application file for complete search history.

(56) References Cited

U.S. PATENT DOCUMENTS

| 6,496,161 | B1 | 12/2002 | Tanaka |
| 8,123,352 | B2 | 2/2012 | Matsumoto et al. |
| 8,502,780 | B1 | 8/2013 | Park |
| 2013/0069787 | A1 | 3/2013 | Petrou |

FOREIGN PATENT DOCUMENTS

WO    WO-2013116246    8/2013

*Primary Examiner* — Mahidere Sahle
(74) *Attorney, Agent, or Firm* — Blakely Sokoloff Taylor & Zafman LLP

(57) ABSTRACT

Embodiments of the disclosure describe on-head detection processes for HMD devices that include at least one lens, an optical sensor positioned in front of the lens to detect light reflected from the lens, at least one image source positioned in front of the lens, and a frame assembly to support the lens and the image source for wearing on a head of the user, wherein the frame assembly comprises a flexible frame assembly to flex such that the optical sensor moves closer to the at least one lens when the HMD is worn by the user. In some embodiments, the optical sensor is positioned to also detect a reflected light from the user's face. The light received by the optical sensor is stronger when the user is wearing the HMD, and thus embodiments determine whether the user is wearing the HMD based on the optical sensor data.

25 Claims, 6 Drawing Sheets

ON-HEAD DETECTION FOR HEAD-MOUNTED DISPLAY

TECHNICAL FIELD

Embodiments of the disclosure relate to the field of computing devices, and more particularly, to head mounted displays (HMDs).

BACKGROUND

A head mounted display (HMD) is a display device worn on or about the head of a user. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image (CGI), while other types of HMDs are capable of superimposing CGI over a real-world view. The former type of HMD is often referred to as virtual reality (VR) while latter type of HMD is often referred to as augmented reality (AR) because the viewer's image of the world is augmented with an overlaying CGI, also referred to as a heads-up display (HUD).

As HMDs incorporate an increasing amount of computing capacity and input/output means (e.g., audio data output, audio/image data capture), they also potentially consume more power. It is important for an HMD to be aware of how it is being used in order to efficiently activate or de-activate its components.

BRIEF DESCRIPTION OF THE DRAWINGS

The present disclosure will be understood more fully from the detailed description given below and from the accompanying drawings of various embodiments of the disclosure, which, however, should not be taken to limit the invention to the specific embodiments, but are for explanation and understanding only.

DETAILED DESCRIPTION

Embodiments of an apparatus, system and method for on-head detection of head mounted display (HMD) devices are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
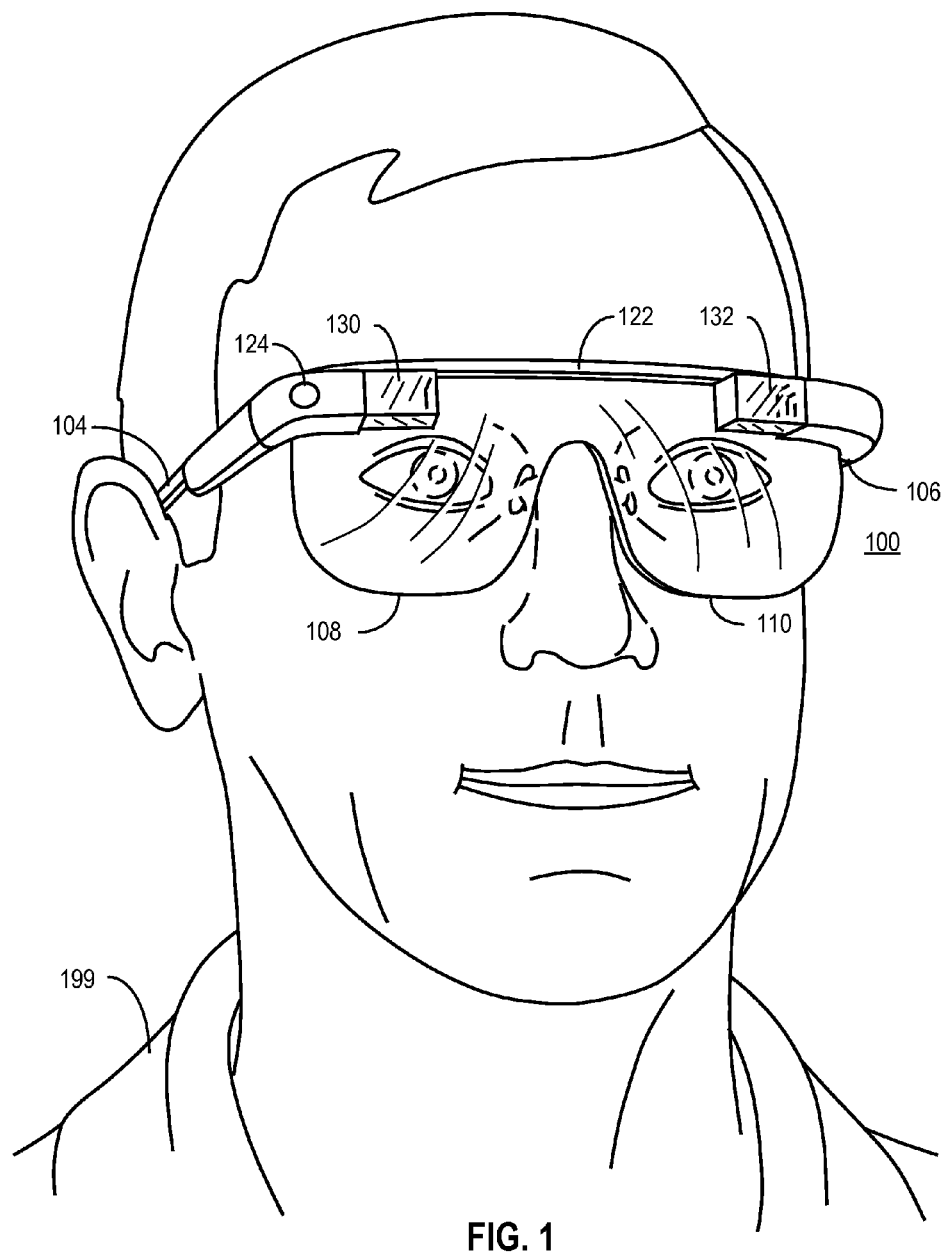
FIG. 1 is an illustration of a head mounted display according to an embodiment of the disclosure.

FIG. 1 is an illustration of an HMD according to an embodiment of the disclosure. HMD 100 is illustrated as a wearable computing device in an eyeglasses frame form; in other embodiments, HMDs may be in other forms that provide a near-to-eye optical display for a user.

In this embodiment, frame 102 of HMD 100 includes center frame support 122 to support lens elements 108 and 110, and extending side-arms 104 and 106. Center frame support 122 and side-arms 104 and 106 are configured to secure frame 102 to the head of user 199 via the user's nose and ears, respectively. Center frame support 122 and extending side-arms 104 and 106 may be formed of a solid structure of plastic or metal, or may be formed of a hollow structure of similar material so as to allow wiring and component interconnects to be internally routed through the frame. Alternatively or additionally, frame 102 may support external wiring.

In this embodiment, lens elements 108 and 110 are at least partially transparent so as to allow user 199 to look through them so that HMD 100 may provide an augmented reality (AR) to the user (i.e., because the user's image of the world is augmented with an overlaying CGI, also referred to as a heads-up display (HUD)). Optical systems 130 and 132 are illustrated as being positioned in front of lenses 108 and 110, respectively, and thus HMD 100 comprises a dual-eye display (i.e., a binocular HMD); other embodiments may comprise a single eye display (i.e., a monocular HMD).

HMD 100 may include an internal processor to process data from, among other sources, various sensors including camera 124 when determining the virtual image that should be displayed to the user. HMD 100 may include a touchpad a user input/output (I/O) interface (not shown) place on either of side arms 104 and 106; in some embodiments, a microphone (not shown) may also be used to capture voice input commands, and camera 124 may be used to capture user gesture based commands.

In this embodiment, camera 124 is shown to be located near optical system 122. Alternatively, camera 124 may be located elsewhere on frame 102, located separately from HMD 100, or be integrated into optical system 130 and/or optical system 132. Camera 124 may image a field of view similar to what the user may see. Furthermore, camera 124 may allow for the processor of HMD 100 to interpret objects within the field of view and display context-sensitive virtual images. For example, if the camera 124 and the HMD processor capture image data and identify a target object, the system could alert user 199 by displaying an overlaid artificial image designed to draw the user's attention to the target object. These images could move depending upon the user's field of view or target object movement—i.e. user head or target object movements may result in the artificial images moving around the viewable area to track the relative motion. Also, optical systems 130 and 132 may display instructions, location cues and other visual cues to enhance interaction with the target object. Camera 124 could be an autofocus camera that provides an autofocus signal. The HMD processor may adjust the length of the optical paths of optical systems 130 and 132 based on the autofocus signal in order to present virtual images that correspond to the environment.

HMD 100 may further include additional computing components and other I/O means (e.g., a motion sensor to detect head movement gestures as user input commands, audio speakers to output audio data to the user, etc.). All of the computing components and I/O means described above consume power provided by HMD 100. As described below, embodiments of the invention determine whether a user is wearing the HMD in order to efficiently activate or de-activate its components and/or features.

Figure 2:
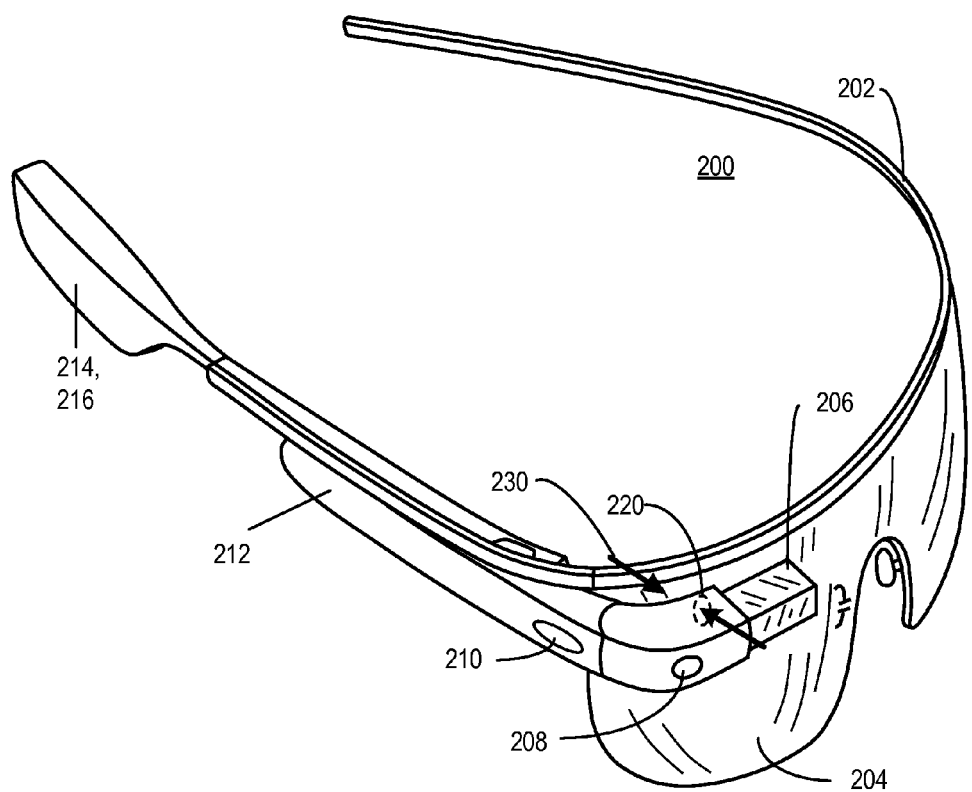
FIG. 2 is an illustration of a head mounted display according to an embodiment of the disclosure.

FIG. 2 is an illustration of an HMD according to an embodiment of the disclosure. HMD 200 is shown to include frame 202, lens 204 and optical system 206. HMD 200 is shown as a monocular device, with single optical output component 206 disposed in-front of lens 204. HMD 200 further includes image sensor 208 to capture image data, microphone 210 to capture audio data, speaker 212 to output audio data, processor 214 and power supply 216 to supply power to the HMD and its components. Not all components of HMD 200 are illustrated; for example, some embodiments may include, for example, connectivity components and location sensors. Connectivity components may comprise components for either or both of cellular and wireless connectivity. As referred to herein, cellular connectivity refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. As referred to herein, wireless connectivity refers to wireless connectivity that is not cellular, and can include personal area networks (such as Bluetooth), local area networks (such as Wi-Fi), and/or wide area networks (such as Wi-Max), or other wireless communication. Locations sensors may utilize the above described connectivity components (e.g., for Wi-Fi or cellular triangulation based processes) or may include other components such as a Global Positioning System (GPS) sensor.

Figure 3:
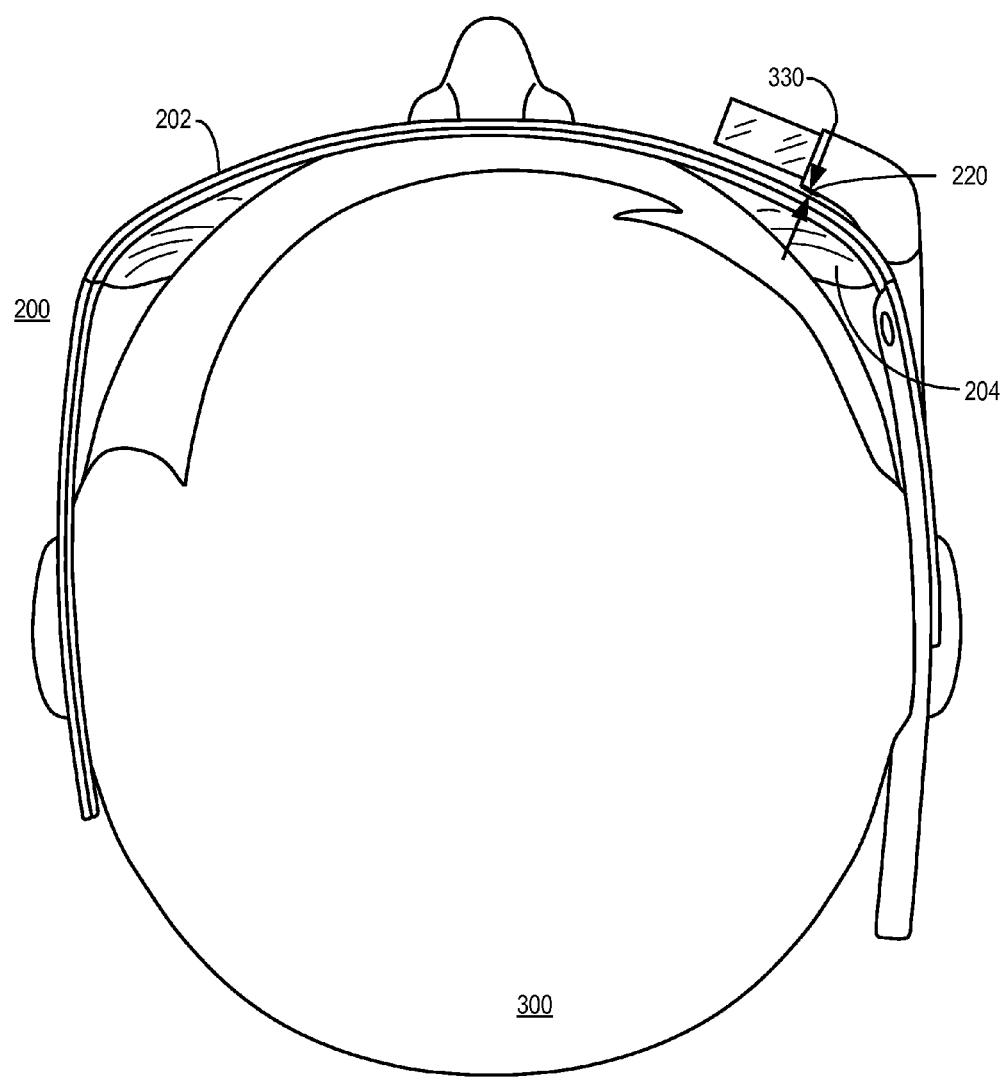
FIG. 3 is a top-view illustration of a head mounted display being worn by a user according to an embodiment of the disclosure.

In this embodiment, HMD 200 includes optical sensor 220 positioned in front of lens 204. Optical sensor 220 may be a photodetector (e.g., phototransistors, photoresistors, photocapacitors, photodiodes, etc.) or any suitable light-sensitive semiconductor junction device configured to convert detected light energy into an electrical signal. Optical sensor 220 is shown to detect light reflected from lens 204. Said light reflected from the lens may comprise, for example, light from optical system 206, or light from a low-level light emitter disposed to reflect light off of lens 204 (not shown). In some embodiments, optical sensor 220 is positioned to also detect light reflected from a user's face (i.e., light reflected from regions of the user's face near optical sensor 220, including by not limited to the user's eye). As illustrated, HMD 200 is not being worn by a user, and thus frame 202 is in a more curved shaped as opposed to when a user is wearing the HMD (as shown in FIG. 3 and discussed further below). In this state, gap 230 shown between optical sensor 220 and lens 204 is a larger distance (i.e., proximity) compared to when a user is wearing the HMD; thus, optical sensor 220 detects a lower amount of light, and logic or modules (e.g., executed via processor 214) may determine that HMD 200 is not currently being worn by a user. In embodiments where optical sensor 220 is positioned to also detect light reflected from a user's face, the optical sensor also detects a lower amount of light due to the absence of light reflected from the user's face.

One or more HMD operational settings are adjusted in response to determining a user is not wearing the HMD. For example, any combination of single optical output component 206, microphone 210 and speaker 212 may be disabled or powered down to a low power state to conserve the power of power supply 216; in some embodiments, microphone 210 may remain enabled to capture user audible commands extracted from speech recognition processes, and/or speaker 212 may remain enabled to output audio alerts. Image sensor 208 may also be disabled or powered-down. In some embodiments, image sensor 208 may capture image data in response to a variety of user commands—e.g., voice commands captured via microphone 210, eye gestures of the user, a camera button disposed on frame 202, etc.; in these embodiments, certain types of user commands for image data capture may be disabled (e.g., voice commands and eye gestures) while others may remain enabled (e.g., the camera button). Furthermore, some processing components may still be in an operational or power-on state, such as processors and memory for executing one or more applications, connectivity components, audio output speakers, location sensors, etc.

FIG. 3 is a top-view illustration of an HMD being worn by a user according to an embodiment of the disclosure. In this illustration, user 300 is shown to be wearing HMD 200 of FIG. 2. As shown in this example, frame 202 and/or the lenses of the HMD are flexed in a manner such that these elements are in a "flatter" state when HMD 200 is being worn by user 300. In this state, gap 330 comprises a smaller distance to lens 204 compared to gap 230 of FIG. 2 (i.e., optical sensor 220 is an a closer "proximity" to the lens); thus, optical sensor 220 detects a higher amount of light, and logic or modules (e.g., executed via processor 214) may determine that HMD 200 currently being worn by a user. In embodiments where optical sensor 220 is positioned to also detect light reflected from a user's face, optical sensor 220 also detects a higher amount of light due to the presence of light reflected from the user's face.

One or more HMD operational settings may be adjusted in response to determining user 300 is wearing HMD 200. For example, any previously disabled combination of single optical output component 206, image sensor 208 (or previously disabled image sensor capture means), microphone 210 and speaker 212 may be enabled or powered up from a low power state. Furthermore, processor 214 may execute applications to display various notifications to inform user 300 of any received network data that could not be displayed to the user in the low power state.

Figure 4:
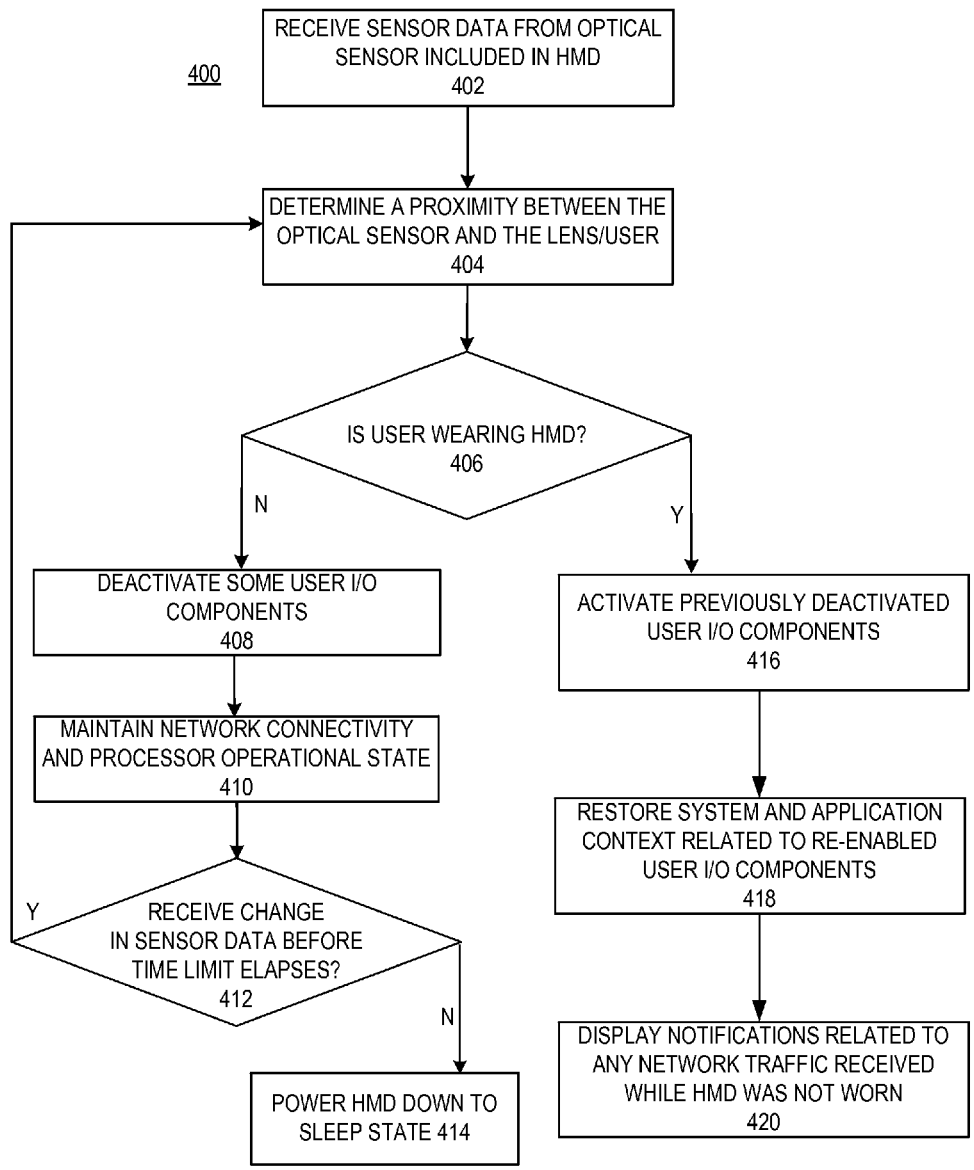
FIG. 4 is a flow diagram of a process for user on-head detection for a head mounted display according to an embodiment of the disclosure.

FIG. 4 is a flow diagram of a process for user on-head HMD detection according to an embodiment of the disclosure. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the disclosure; thus, not all actions are required in every implementation. Other process flows are possible.

Process 400 includes operations for receiving sensor data from an optical sensor included in an HMD, 402. As described above, an optical sensor is positioned over a lens of the HMD to detect light reflected from the lens. In some embodiments, the optical sensor is positioned to also detect light reflected from a user's face when the HMD is worn by the user. Depending on whether a user is wearing said HMD, the amount of light reflected from the lens and detected by the user may vary. For example, in some embodiments, when the user is not wearing the HMD, the frame and lens of the HMD are flexed to a curved state, and the optical sensor is less proximate to the lens (i.e., compared to when the user is wearing the HMD, as discussed further below). Thus, the amount of light reflected by the HMD lens is less than the amount of light reflected when the frame and lens of the HMD is in a flatter state (i.e., when worn by the user, and the optical sensor is closer or more proximate to the lens). In embodiments where the optical sensor is positioned to also detect light reflected from a user's face, the optical sensor also detects a lower amount of light due to the absence of light reflected from the user's face. Thus, the optical sensor acts as a "proximity sensor" in that the sensor may detect different light intensities depending on the distance between the optical sensor and the lens, which changes based on whether the user is wearing the HMD. In this example, a proximity between the HMD and the lens (and/or the user's face) is determined from the optical sensor data, 404; from this determined proximity, it is determined whether or not the user is wearing the HMD, 406.

In response to determining the user is wearing the HMD, either the operational status of the HMD is maintained, or the HMD is transitioned from a reduced-power state (as illustrated in this example and described below). In response to determining the user is not wearing the HMD (i.e., the HMD has been doffed by the user), some user I/O components of the HMD are deactivated, 408, to reduce the power consumption of the HMD. For example, components directly related to optical user I/O, such as the optical output system and optical image sensor of the HMD, may be disabled and their related application contexts (e.g., data displayed to the user) may be saved. In some embodiments, other I/O components, such as an audio speaker, may be disabled, or may remain enabled to output an audio signal, such as a chime. For example, the audio speaker may remain enabled to keep audio on for notifications or alerts in response to receiving network or cellular data (e.g., phone calls, short messaging service (SMS) messages, multimedia messaging service (MMS) messages, etc.), or to output an alarm output signal in response to a user-defined alarm event. In some of these embodiments, notifications or alerts may be selectively output based on a prioritization scheme. Location sensors may also remain enabled to continually update the location of the HMD for location based services.

In this embodiment, network connectivity and processing components (e.g., a network interface) may remain enabled, 410. Network connectivity components may continue to receive network data (i.e., any of network or cellular data); in some embodiments, network connectivity may be maintained at a reduced polling rate in response to determining the HMD is not being worn by the user. Processing components may continue to execute processes, for example, to determine the location of the HMD, to process received network traffic, etc. In other embodiments, network connectivity may be disabled in response to determining the user is not wearing the HMD. Furthermore, the optical sensor to detect light reflected by the lens may remain enabled. The HMD may remain in this partially activated state until a time threshold lapses, 412.

In this embodiment, if time threshold passes with the HMD not being worn by the user (i.e., a change in sensor data is received indicating the HMD is in a different wear state), the HMD is powered down to a sleep state, 414. For example, the application and system states of the HMD may be held in memory (such as non-volatile memory) when placed in a sleep mode, and the components of the HMD are powered down or disabled completely.

If sensor data is received before the time threshold lapses, it is determined whether the HMD is being worn by the user (in this example, by again executing operation 404 to determine the proximity between the optical sensor and the lens of the HMD and/or user). As described above, the light reflected by the HMD lens and detected by the optical sensor is stronger when the frame and lens of the HMD is in a flatter state compared to when the HMD and lens are in a more curved state (i.e., when the HMD is not being worn by the user); furthermore, in embodiments where the optical sensor is positioned to also detect light reflected from the user's face, the light detected by the optical sensor increases when the HMD is worn by the user. In this example, a previously doffed HMD is now being worn by the user, so the user I/O components of the HMD that were previously deactivated are activated, 416, in response to determining the HMD is being worn by the user. The system and application context previously presented to the user by the optical output system may be restored, 418. For example, a previous application state may be restored, or a default output of the optical output system (e.g., a home screen) may be displayed. Furthermore, in this embodiment, notifications related to any network (e.g., cellular) traffic received by the HMD while it was not being worn by the user may be displayed, 420.

Figure 5:
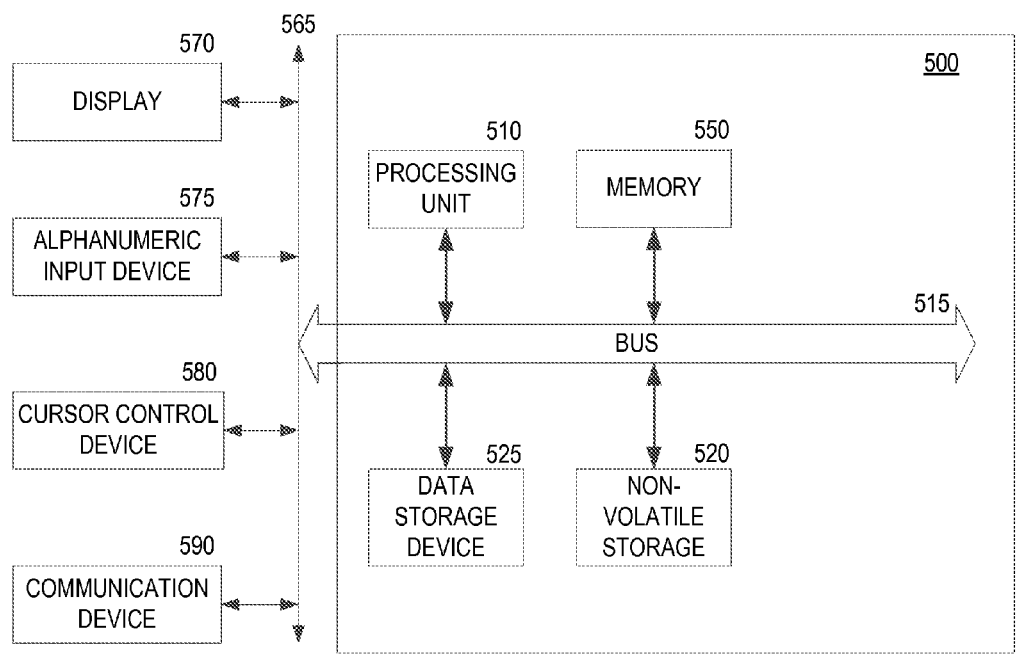
FIG. 5 is an illustration of components of a device to utilize an embodiment of the disclosure.

FIG. 5 is an illustration of components of a device to utilize an embodiment of the disclosure. Any combination of the components for platform 500 may be included in any of the HMDs described above. For example, platform 500 may comprise display driver components communicatively coupled an HMD display device. Platform 500 may be used to decode/convert content into video signal formats such as high definition multimedia interface (HDMI), component, composite digital visual interface (DVI), video graphics adapter (VGA), Syndicat des Constructeurs d'Appareils Radiorecepteurs et Televiseursor (SCART), or other video signal formats.

Platform 500 as illustrated includes bus or other internal communication means 515 for communicating information, and processor 510 coupled to bus 515 for processing information. The platform further comprises random access memory (RAM) or other volatile storage device 550 (alternatively referred to herein as main memory), coupled to bus 515 for storing information and instructions to be executed by processor 510. Main memory 550 also may be used for storing temporary variables or other intermediate information during execution of instructions by processor 510. Platform 500 also comprises read only memory (ROM) and/or static storage device 520 coupled to bus 515 for storing static information and instructions for processor 510, and data storage device 525 such as a magnetic disk, optical disk and its corresponding disk drive, or a portable storage device (e.g., a universal serial bus (USB) flash drive, a Secure Digital (SD) card). Data storage device 525 is coupled to bus 515 for storing information and instructions.

Platform 500 may further be coupled to display device 570, such as a cathode ray tube (CRT) or an LCD coupled to bus 515 through bus 565 for displaying information to a computer user. In embodiments where platform 500 provides computing ability and connectivity to a created and installed display device, display device 570 may comprise any of the tileable display panels described above. Alphanumeric input device 575, including alphanumeric and other keys, may also be coupled to bus 515 through bus 565 (e.g., via infrared (IR) or radio frequency (RF) signals) for communicating information and command selections to processor 510. An additional user input device is cursor control device 580, such as a mouse, a trackball, stylus, or cursor direction keys coupled to bus 515 through bus 565 for communicating direction information and command selections to processor 510, and for controlling cursor movement on display device 570. In embodiments utilizing a touch-screen interface, it is understood that display 570, input device 575 and cursor control device 580 may all be integrated into a touch-screen unit.

Another device, which may optionally be coupled to platform 500, is a communication device 590 for accessing other nodes of a distributed system via a network. Communication device 590 may include any of a number of commercially available networking peripheral devices such as those used for coupling to an Ethernet, token ring, Internet, or wide area network. Communication device 590 may further be a null-modem connection, or any other mechanism that provides connectivity between computer system 500 and the outside world. Note that any or all of the components of this system illustrated in FIG. 5 and associated hardware may be used in various embodiments of the disclosure.

It will be appreciated by those of ordinary skill in the art that any configuration of the system illustrated in FIG. 5 may be used for various purposes according to the particular implementation. The control logic or software implementing embodiments of the disclosure can be stored in main memory 550, mass storage device 525, or other storage medium locally or remotely accessible to processor 510.

It will be apparent to those of ordinary skill in the art that any system, method, and process to capture media data as described herein can be implemented as software stored in main memory 550 or read only memory 520 and executed by processor 510. This control logic or software may also be resident on an article of manufacture comprising a computer readable medium having computer readable program code embodied therein and being readable the mass storage device 525 and for causing processor 510 to operate in accordance with the methods and teachings herein.

Embodiments of the disclosure may also be embodied in a handheld or portable device containing a subset of the computer hardware components described above and operatively coupled to an HMD display component. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a LCD or display element matrix for displaying information to a user of the handheld device. Conventional methods may be used to implement such a handheld device. The implementation of the disclosure for such a device would be apparent to one of ordinary skill in the art given the disclosure as provided herein.

Embodiments of the disclosure may also be embodied in a special purpose appliance including a subset of the computer hardware components described above. For example, the appliance may include processor 510, data storage device 525, bus 515, and memory 550, and only rudimentary communications mechanisms, such as a small touch-screen that permits the user to communicate in a basic manner with the device. In general, the more special-purpose the device is, the fewer of the elements need be present for the device to function.

Figure 6:
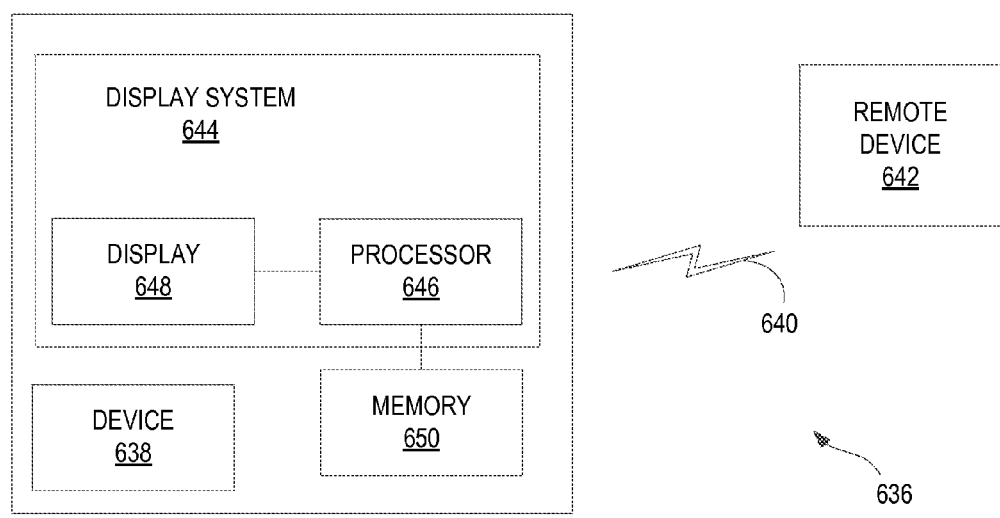
FIG. 6 illustrates an example computer network infrastructure for network accessible head mounted displays according to an embodiment of the disclosure.

FIG. 6 illustrates an example computer network infrastructure for network accessible HMDs according to an embodiment of the disclosure. In system 636, device 638 communicates using communication link 640 (e.g., a wired or wireless connection) to remote device 642. Device 638 may be any type of device that can receive data and display information corresponding to or associated with the data. For example, device 638 may any of the HMDs described above.

Device 638 includes display system 644 comprising processor 646 and display 648. Display 648 may be, for example, an optical see-through display, an optical see-around display, or a video see-through display. Processor 646 may receive data from remote device 642, and configure the data for display. Processor 646 may be any type of processor, such as a micro-processor or a digital signal processor, for example.

Device 638 may further include on-board data storage, such as memory 650 coupled to processor 646. Memory 650 may store software that can be accessed and executed by processor 646, for example.

Remote device 642 may be any type of computing device or transmitter including a laptop computer, a mobile telephone, etc., that is configured to transmit data to device 638. Remote device 642 and device 638 may contain hardware to enable communication link 640, such as processors, transmitters, receivers, antennas, etc.

Communication link 640 is illustrated as a wireless connection; however, wired connections may also be used. For example, communication link 640 may be a wired link via a serial bus such as a universal serial bus or a parallel bus. A wired connection may be a proprietary connection as well. Communication link 640 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), among other possibilities. Remote device 642 may be accessible via the Internet and may comprise a computing cluster associated with a particular web service (e.g., social-networking, photo sharing, address book, etc.) to receive captured media data as described above.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing", "determining", "analyzing", "driving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The algorithms and displays presented above are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout the above specification are not necessarily all referring to the same embodiment. Furthermore, the particular features, structures, or characteristics may be combined in any suitable manner in one or more embodiments.

The present description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the various embodiments with various modifications as may be suited to the particular use contemplated.

The invention claimed is:

1. A method comprising:
   receiving sensor data from an optical sensor included in a head-mount display (HMD), the HMD further comprising:
   at least one lens, wherein the optical sensor is positioned in front of the at least one lens to detect a reflected light from the at least one lens;
   at least one image source positioned in front of the at least one lens; and
   a frame assembly to support the at least one lens and the at least one image source for wearing on a head of a user, wherein the frame assembly of the HMD comprises a flexible frame assembly, and wherein the frame assembly flexes such that the optical sensor moves closer to the at least one lens when the HMD is worn by the user;
   determining a proximity between the optical sensor and the at least one lens based, at least in part, on the sensor data; and
   determining whether the user is wearing the HMD based, at least in part, on the proximity between the optical sensor and the at least one lens.

2. The method of claim 1, wherein the optical sensor is positioned to further detect a reflected light from the user's face, and the method further comprises:
   determining a proximity between the optical sensor and the user's face based, at least in part, on the sensor data; wherein determining whether the user is wearing the HMD is further based, at least in part, on the proximity between the optical sensor and the user's face.

3. The method of claim 1, further comprising:
   in response to determining the user is not wearing the HMD, deactivating the at least one image source from generating light for the HMD; and
   in response to determining the user is wearing the HMD, activating the at least one image source to generate light for the HMD.

4. The method of claim 1, further comprising:
   in response to determining the user is not wearing the HMD, transitioning a power state of the HMD from a power-on state to a power-save state; and
   in response to determining the user is wearing the HMD, transitioning the power state of the HMD from the power-save state to the power-on state.

5. The method of claim 4, wherein transitioning the power state of the HMD from the power-on state to the power-save state comprises saving a system context to a non-volatile memory of the HMD, and wherein transitioning the power state of the HMD from the power-save state to the power-on state comprises restoring the system context from the non-volatile memory of the HMD.

6. The method of claim 1, wherein the HMD further comprises a light emitter disposed near the optical sensor to emit light towards the at least one lens, and wherein the reflected light from the at least one lens comprises light from the light emitter reflected from the at least one lens.

7. The method of claim 1, wherein the HMD further comprises a network interface for connecting to at least one of a Wi-Fi or cellular network, and wherein the method further comprises:
   in response to determining the user is not wearing the HMD, maintaining a network connection via the network interface while the user is not wearing the HMD.

8. The method of claim 7, wherein maintaining the network connection via the network interface in response to determining the user is not wearing the HMD includes reducing a network polling rate for the network interface.

9. The method of claim 1, wherein HMD further comprises an audio speaker to output audio data, and the method further comprises:

in response to the determining the user is not wearing the HMD, disabling the audio speaker from outputting at least one of an alarm output or an audio notification output.

10. A system comprising: head-mounted display (HMD) comprising: at least one lens; at least one image source positioned in front of the at least one lens to generate light for the HMD; an optical sensor positioned in front of the at least one lens to detect a reflected light from the at least one lens; and a frame assembly to support the at least one lens and the at least one image source for wearing on a head of a user, wherein the frame assembly comprises a flexible frame assembly, and wherein the frame assembly flexes such that the optical sensor moves closer to the at least one lens when the HMD is worn by the user; and a processor communicatively coupled to the HMD, wherein the processor is configured to: receive sensor data from the optical sensor; determine a proximity between the optical sensor and the at least one lens based, at least in part, on the sensor data; and determine whether the user is wearing the HMD based, at least in part, on the proximity between the optical sensor and the at least one lens.

11. The system of claim 10, wherein the optical sensor is positioned to further detect a reflected light from the user's face, and the processor to further;
 determine a proximity between the optical sensor and the user's face based, at least in part, on the sensor data; wherein determining whether the user is wearing the HMD is further based, at least in part, on the proximity between the optical sensor and the user's face.

12. The system of claim 10, the processor to further:
 in response to determining the user is not wearing the HMD, deactivate the at least one image source from generating light for the HMD; and
 in response to determining the user is wearing the HMD, activate the at least one image source to generate light for the HMD.

13. The system of claim 10, the processor to further:
 in response to the determining the user is not wearing the HMD, transition a power state of the HMD from a power-on state to a power-save state; and
 in response to the determining the user is wearing the HMD, transition the power state of the HMD from the power-save state to the power-on state.

14. The system of claim 13, further comprising:
 non-volatile memory; wherein transitioning the power state of the HMD from the power-on state to the power-save state comprises saving a system context to the non-volatile memory, and transitioning the power state of the HMD from the power-save state to the power-on state comprises restoring the system context from the non-volatile memory of the HMD.

15. The system of claim 10, wherein the HMD further comprises:
 a light emitter disposed near the optical sensor to emit light towards the at least one lens; wherein the reflected light from the at least one lens comprises light from the light emitter reflected from the at least one lens.

16. The system of claim 10, further comprising:
 a network interface for connecting to at least one of a Wi-Fi or cellular network; wherein the processor to further:
 in response to the determining the user is not wearing the HMD, maintain a network connection via the network interface.

17. The system of claim 16, wherein maintaining the network connection via the network interface in response to determining the user is not wearing the HMD includes reducing a network polling rate for the network interface.

18. The system of claim 10, wherein HMD further comprises an audio speaker to output audio data, and the processor to further:
 in response to the determining the user is not wearing the HMD, disable the audio speaker from outputting at least one of an alarm output or an audio notification output.

19. A non-transitory computer readable storage medium including instructions that, when executed by a processor, cause the processor to perform a method comprising:
 receiving sensor data from an optical sensor included in a head-mount display (HMD), the HMD further comprising:
  at least one lens, wherein the optical sensor is positioned in front of the at least one lens to detect a reflected light from the at least one lens;
  at least one image source positioned in front of the at least one lens; and
  a frame assembly to support the at least one lens and the at least one image source for wearing on a head of a user, wherein the frame assembly of the HMD comprises a flexible frame assembly, and wherein the frame assembly flexes such that the optical sensor moves closer to the at least one lens when the HMD is worn by the user;
 determining a proximity between the optical sensor and the at least one lens based, at least in part, on the sensor data; and
 determining whether the user is wearing the HMD based, at least in part, on the proximity between the optical sensor and the at least one lens.

20. The non-transitory computer readable storage medium of claim 19, wherein the optical sensor is positioned to further detect a reflected light from the user's face, and the method further comprises:
 determining a proximity between the optical sensor and the user's face based, at least in part, on the sensor data; wherein determining whether the user is wearing the HMD is further based, at least in part, on the proximity between the optical sensor and the user's face.

21. The non-transitory computer readable storage medium of claim 19, wherein the method further comprises:
 in response to the determining the user is not wearing the HMD, deactivating the at least one image source from generating light for the HMD; and
 in response to the determining the user is wearing the HMD, activating the at least one image source to generate light for the HMD.

22. The non-transitory computer readable storage medium of claim 19, wherein the method further comprises:
 in response to determining the user is not wearing the HMD, transitioning a power state of the HMD from a power-on state to a power-save state; and
 in response to the determining the user is wearing the HMD, transitioning the power state of the HMD from the power-save state to the power-on state.

23. The non-transitory computer readable storage medium of claim 22, wherein transitioning the power state of the HMD from the power-on state to the power-save state comprises saving a system context to a non-volatile memory of the HMD, and wherein transitioning the power state of the HMD from the power-save state to the power-on state comprises restoring the system context from the non-volatile memory of the HMD.

24. The non-transitory computer readable storage medium of claim 19, wherein the HMD further comprises a light emitter disposed near the optical sensor to emit light towards the at least one lens, and wherein the reflected light from the at least one lens comprises light from the light emitter reflected from the at least one lens.

25. The non-transitory computer readable storage medium of claim 19, wherein the HMD further comprises a network interface for connecting to at least one of a Wi-Fi or cellular network, and wherein the method further comprises:
   in response to the determining the user is not wearing the HMD, maintaining a network connection via the network interface.

\* \* \* \* \*